United States Patent [19]

Dalton et al.

[11] 4,058,740
[45] Nov. 15, 1977

[54] ENTRY-CONTROLLED ENERGY SYSTEM

[75] Inventors: James H. Dalton, Nashville; S. Dalton Stover, Adamsville, both of Tenn.; Robert M. Roney, Huntsville, Ala.

[73] Assignee: Lok-A-Wat, Inc., Adamsville, Tenn.

[21] Appl. No.: 557,797

[22] Filed: Mar. 12, 1975
(Under 37 CFR 1.47)

[51] Int. Cl.² .................................. G08B 21/00
[52] U.S. Cl. ............................ 307/116; 340/275; 340/274 R
[58] Field of Search ............ 307/116, 113, 112, 114; 340/275, 274 R, 282, 309.1; 219/507

[56] References Cited
U.S. PATENT DOCUMENTS 2,693,591  11/1954  Morse .................................. 340/275
3,196,293  7/1965  Howard ................................ 307/114

Primary Examiner—Herman J. Hohauser

[57] ABSTRACT

An electrical system for controlling energy output within an enclosed space, such as a motel room, including a door switch adapted to be controlled by the opening and closing of the door and a latch switch adapted to be controlled by the operation of a door latch. The system may control several types of electrical devices, such as a heating and air-conditioning unit, illuminating devices and electrical outlets within the room.

The system is so designed that when the door is closed and latched from the inside all electrical devices will function normally. When the room is unoccupied, with the door closed and the inside latch unlatched, the electrical devices will be turned off or switched to a low-energy background level.

8 Claims, 5 Drawing Figures

ENTRY-CONTROLLED ENERGY SYSTEM

BACKGROUND OF THE INVENTION

This invention relates to an energy control system, and more particularly to entry-actuated controls for an energy system for an enclosed space.

Bolt or latch-actuated switches for controlling room light circuits, and particularly for opening the light circuit in a hotel room when not occupied, have long been known in the art, as indicated in the following U.S. patents:

463,793, Hodgson et al., Nov. 24, 1891;
926,001, Hart, June 22, 1909;
1,468,321, Newsom, Sep. 18, 1923;
1,723,956, Schuerman, Aug. 6, 1929;
1,825,448, Fassmann, Sep. 29, 1931;
2,693,591, Morse, Nov. 2, 1954.

The U.S. Thiberville Pat. No. 2,756,300 issued July 24, 1955 discloses a lock control switch which could be adapted for controlling an air-conditioning system.

The U.S. Kelley et al. Pat. No. 2,637,801 issued May 5, 1953 and the Murphy et al. U.S. Pat. No. 3,221,211 issued Nov. 30, 1965, disclose door switches which, when the door is opened, illuminate a lamp for a predetermine time after the door is closed, after which time the lamp is extinguished.

The U.S. Jette, Jr., Pat. No. 3,514,557 issued May 26, 1970, discloses a door bolt-actuated switch for controlling an electrical outlet within a room.

The U.S. Takei Pat. No. 3,771,154 issued Nov. 6, 1973, discloses a transistorized circuit for controlling a warning or alarm, in which an RC time-delay circuit is employed for delaying the alarm signal a predetermined time after the switch is actuated.

SUMMARY OF THE INVENTION

It is an object of this invention to provide a device for switching the energy system or electrical circuitry within an occupied room to an energized or high-energy background level upon entry to the room, and to switch the energy system or electrical circuitry within an unoccupied room to a de-energized or low-energy background level upon exit from the room.

The system includes a door switch adapted to be closed by the opening of the door and opened by the closing of the door. The system also includes a second or door latch switch which is adapted to be manually operated from the inside of the room between an inoperative or unlatched open position and an operative or latched closed position. These two switches are connected in an electrical control circuit including a time-delay mechanism and switching devices for turning on and off or changing the energy levels of various devices which use electrical energy within an enclosed space or room. The system has been designed particularly for controlling the heating and air-conditioning system, the lights and electrical outlets to which may be connected lamps, TV sets, and other electrical applicances, within a space, such as a hotel room, a motel room, a home, apartment, mobile home, or any other type room.

In this system, when the room is unoccupied with the door closed and unlatched, all of the circuits are off. However, the heating and air-conditioning circuit may be re-energized at lower energy levels by by-pass thermostatic switches, which will maintain the room at a lower temperature than normal room temperature during the heating cycle and a higher than normal room temperature during the cooling cycle, in order to conserve electrical energy, yet prevent the room and furniture from deteriorating from over-cooling or overheating.

The system is so designed that a person, upon opening the door, actuates the door switch to turn on all the electrical circuits to normal operating levels. When the person enters the room and closes the door, the door switch is again opened, but in opening activates a time-delay circuit to prevent the electrical circuits from reverting to their background levels for a predetermined length of time. During this time, the occupant of the room will manually actuate the latch to close the latch switch which will cancel out the time-delay and maintain all electrical circuits and appliances within the room in their normal operating levels for as long as the latch switch is closed. Even if the latch is not thrown within the predetermined time, it may be thrown after the predetermined time and after the circuits have reverted to their background levels, to immediately restore the circuits to their normal operating levels.

When the guest or occupant leaves the room, he unlatches the door, which starts the timing cycle, but the circuits remain in their normal operating levels, for the predetermined time. When the departing guest opens the door, the timing function is cancelled and the circuits are held in or restored to their normal operating levels. After the departing guest closes the door, the electrical circuits and appliance will remain in their operating levels for the predetermined period established by the time-delay circuit, after which time all circuits and appliances revert to their background levels.

Thus, this system can substantially reduce the consumption of unused and wasted energy, automatically, when the room within which the circuits are located, is unoccupied. Moreover, as an occupant enters the room, the circuits are immediately restored to their operating levels automatically, and the normal operating energy levels may be maintained by a simple manual operation, i.e. throwing the latch.

DESCRIPTION OF THE PREFERRED EMBODIMENTS

Figure 1:
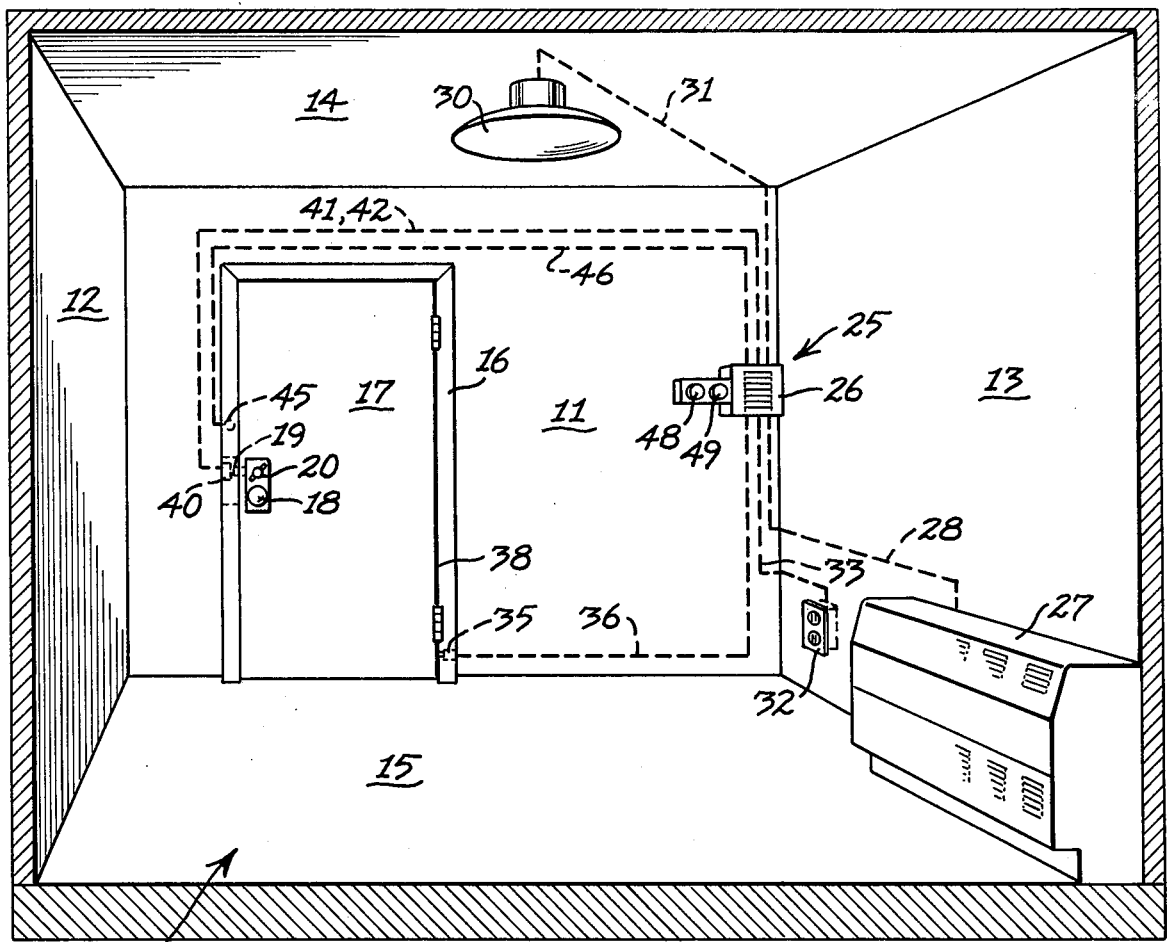
FIG. 1 is an interior perspective view of a room within which the energy system, made in accordance with this invention, is mounted for controlling a heating and air-conditioning system, a lamp and electrical outlets.
Figure 2:
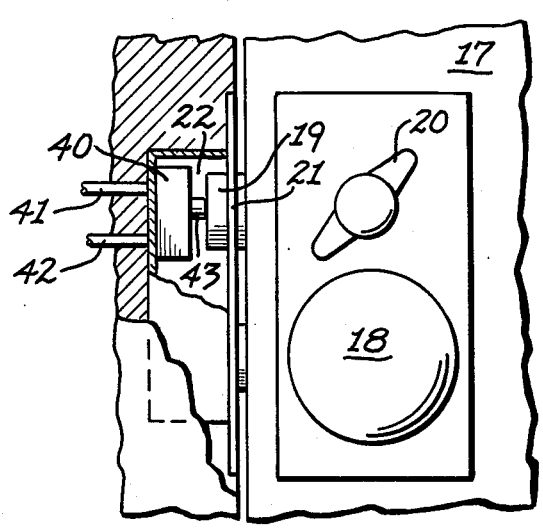
FIG. 2 is an enlarged fragmentary sectional interior view of the door latch and latch-actuated switch.

Referring now to the drawings in more detail, FIG. 1 discloses a typical enclosed space, such as a motel room 10, including a front interior wall 11, side walls 12 and 13, a ceiling 14 and a floor 15. An entry opening is formed in the front wall 12 and defined by the door jamb 16 within which is hingedly supported the door 17. The door 17 is provided with an interior doorkno 18 and a dead-bolt or latch 19 adapted to be manipulated by the manual rotary latch handle 20 for positive latching and unlatching through the striker plate 21 into the latch recess 22.

The system 25 made in accordance with this invention includes a control panel 26 which may be mounted in any convenient position, such as upon the front wall 11 (FIG. 1).

The energy output devices controlled by the system 25 may be the air-conditioning or combined heating and cooling unit 27 mounted against the side wall 13 and connected through lead 28 to control panel 26. The term "air conditioning" will be employed in its broad sense to include any conditioning of air, including heating, cooling, circulating, filtering or purifying etc. Another energy output device might be the ceiling lamp 30 connected through lead 31 to the control panel 26. The double electrical outlets 32 may also be connected through lead 33 to the control panel 26.

Figure 3:
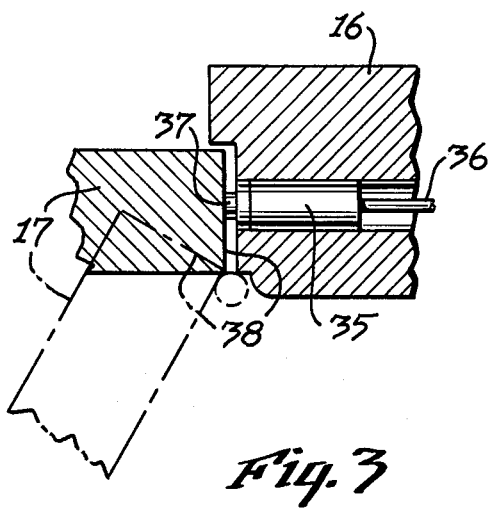
FIG. 3 is a fragmentary horizontal sectional view of the door and door switch.

The devices for actuating the system 25 include the door switch 35 connected through lead 36 to the control panel 26. The door switch 35 (FIG. 3) may be mounted within the door jamb 16 and provided with a plunger 37 adapted to be engaged by the hinged edge 38 of the door 17 in closed position for depressing the plunger 37 and opening the switch 35. When the door 17 is swung to its open position, disclosed in phantom in FIG. 3, its hinged edge 38 disengages the plunger 37 to close the switch 35.

Also connected to the control panel 26 is an override switch in the form of latch switch 40 connected through leads 41 and 42. The latch switch 40 is also provided with an actuating plunger 43 adapted to be depressed by the dead-bolt or latch 19 in its thrown or latched position to close the switch 40. When the latch 19 is retracted to its inoperative or unlatched position, the plunger 43 protracts to open the switch 40.

A pilot light or occupancy light or lamp 45 is mounted on the outside of the door jamb 16 and is connected through lead 46 to the control panel 26.

Mounted upon the control panel 26 is a thermostatic switch plate including a push-button by-pass thermostatic heating switch 48 and a push-button by-pass thermostatic cooling switch 49.

Figure 4:
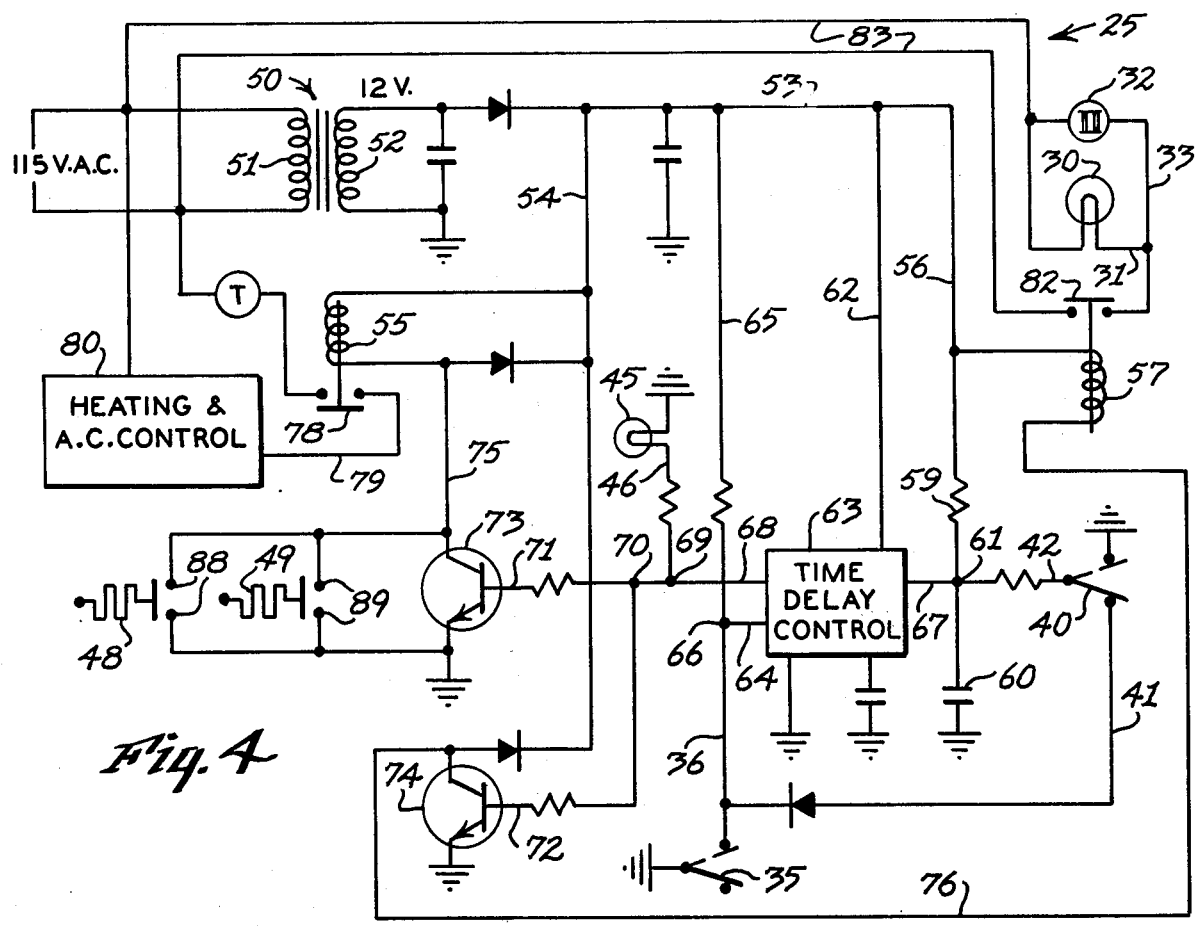
FIG. 4 is a schematic electrical circuit diagram of the energy system.

Referring now to FIG. 4, the energy system 25 includes a supply voltage, such as 115 volts A.C. supplied to the primary coil 51 of transformer 50, which reduces the supply voltage in the secondary coil 52 to about 12 volts. The secondary supply voltage line 53 is connected through lead 54 to air-conditioning relay coil 55 and through lead 56 to a lighting relay coil 57. Secondary voltage is also supplied through lead 56 to timing resistor 59 and timing capacitor 60 through junction 61. Secondary voltage is also supplied from line 53 through lead 62 to the time-delay control circuit 63. Voltage is applied to the trigger input lead 64 of the time-delay control circuit 63 through resistive lead 65 and junction 66.

Door switch 35 is disclosed in FIG. 4 in its solid-line, open position when the door 17 is closed. When the door 17 is opened, the switch 35 moves to its dashed-line position to ground the lead 36 and thereby reduce the voltage upon the trigger input lead 64.

The override or latch switch 40 is disclosed in its solid-line position in FIG. 4 when the latch bolt 19 is unlatched and the switch 40 is "open." When the latch bolt 19 is thrown to close the switch 40, the switch 40 moves to its dashed-line position of FIG. 4 grounding the resistive lead 42 and consequently the threshold input lead 67 of the time-delay control circuit 63, as well as the timing capacitor 60.

The digital output lead 68 of the time-delay control circuit 63 is connected to the pilot lamp circuit 46 through junction 69 and through junction 70 to the biasing base leads 71 and 72 of the transistors 73 and 74, respectively. The collector of transistor 73 is connected through lead 75 to air-conditioning relay coil 55. The collector of the transistor 74 is connected through lead 76 to the illuminating relay coil 57. The emitters of both transistors 73 and 74 are grounded.

The air-conditioning relay coil 55 is adapted to control the relay switch 78 in one of the power leads 79 of the heating and air-conditioning control 80. The power lead 79 also includes a conventional thermostat T, which may be set at room temperature.

The relay coil 57 is adapted to control the relay switch 82 in the electrical power circuit 83 including the ceiling lamp 30 and one or more electrical outlets 32, and any other electrical appliance connections or electrical outputs for the room 10.

The push-button by-pass heating and cooling thermostatic switches 48 and 49 are connected in parallel across the collector and emitter of the transistor 73. The thermostatic element of the heating switch 48 may be set to close at a temperature below room temperature, such as 60° F. When the switch 48 is pushed to close the contacts 88 and the temperature falls below 60° F, then current will flow through the air-conditioning relay coil 55 to close the relay switch 78, whether or not the transistor 73 is conducting.

In a similar manner, the by-pass cooling thermostatic switch 49 may be set to close when the temperature within the room 10 rises to approximately 90° F. Thus, when the thermostatic switch 49 is pressed to close the contacts 89 and the temperature rises to the threshold temperature of 90° or above, the relay coil 55 will be energized to close the relay 78 and actuate the heating and air-conditioning controls 80, regardless of whether the transistor 73 is conducting.

Figure 5:
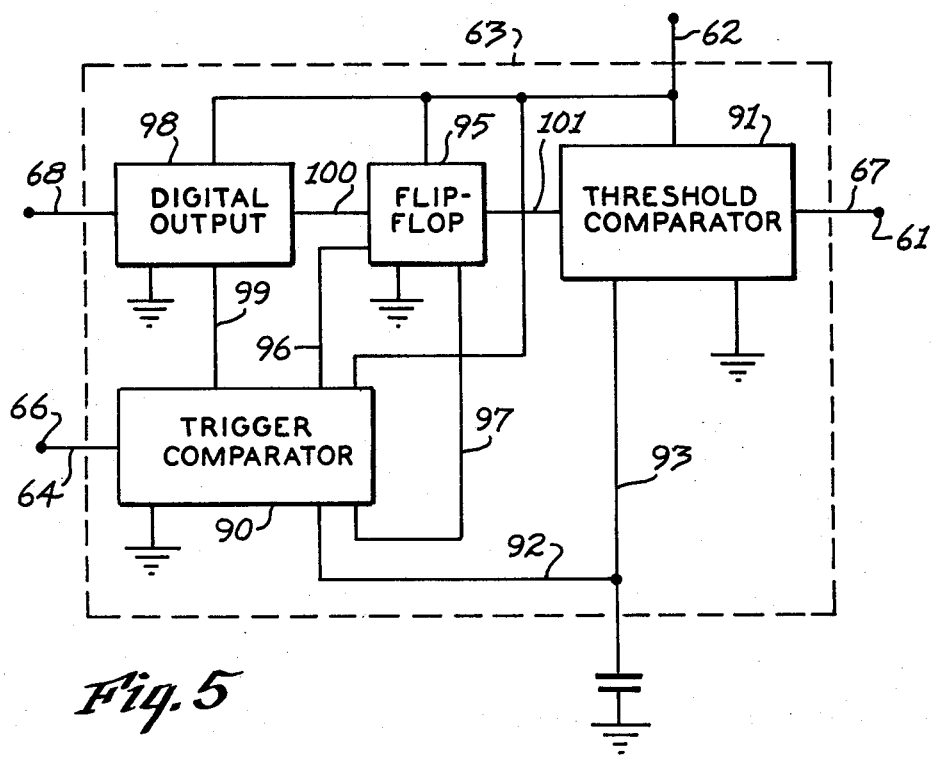
FIG. 5 is a block circuit diagram of the time-delay control.

In the time-delay control circuit 63, as illustrated by the block circuit diagram of FIG. 5, the trigger input lead 64 is connected to a trigger comparator circuit 90, while the threshold input lead 67 is connected to a threshold comparator circuit 91. The trigger comparator circuit 90 and the threshold comparator circuit 91 are connected through the leads 92 and 93, respectively. The trigger comparator circuit 90 is also connected to the flip-flop 95 through leads 96 and 97, and is connected to the digital output circuit 98 through lead 99. The flip-flop circuit 95 and digital output circuit 98 are connected through lead 100. The flip-flop circuit 95 is connected to the threshold comparator 91 through lead 101. The voltage supply circuit 62 supplies voltage to the trigger comparator circuit 90, threshold comparator circuit 91, flip-flop circuit 95 and digital output circuit 98. The design of the time-delay control circuit 63 is well-known in the art and is included in the system 25 in order to control the functions of the timing resistor 59 and capacitor 60 in order to provide the time-delay required in the energy control system 25. An example is #555 Timer Chip, manufactured by a number of different concerns.

When the system 25 is in its background energy mode or level with the room 10 unoccupied, the door 17 closed and the latch bolt 19 unlatched, all of the switches disclosed in FIG. 4 are in their solid-line positions. The door switch 35, the latch switch 40 and the relay switches 78 and 82 are open. Although the by-pass thermostatic switches 48 and 49 are disclosed in their open positions, one of these switches would close its corresponding contacts 88 or 89, depending upon the season of the year. During the winter season, the heating and air-conditioning control 80 would be in its heating mode and the push-button heating thermostatic switch 48 would close its contacts 88, so that when the temperature in the room dropped below the threshold temperature, such as 60° F., the thermostatic element of the switch 49 would close to energize the relay coil 55 and close relay switch 78 through the power lead 79 to energize the heating and air-conditioning control 80 causing the air-conditioning unit 27 to heat the room 10 to maintain the space temperature at 60° F.

In the cooling season, such as the summer, the reverse would be true. The by-pass thermostatic switch 48 would be retracted to disengage the contacts 88, while the by-pass thermostatic switch 49 would be pushed to engage the contacts 89, energizing the relay coil 55 to close the relay switch 78, when the temperature within the room 10 rose to the threshold temperature, such as 90° F. In this manner, the air-conditioning unit 27 will cool the room to maintain the temperature within the room 10 at or below 90° F.

When a person, such as a room guest, enters the room 10, the opened door 17 releases the plunger 37 to close the switch 35, moving it to its dashed-line position of FIG. 4, and immediately grounding the lead 36. The grounding of the lead 36 immediately drops the voltage applied through the trigger input lead 64 below a set threshold voltage creating an output signal in the lead 96 to trigger the flip-flop circuit 95 to reduce its output from high to low. The low-level output of the flip-flop 95 drives the digital output 98 to its high state. In the high state, the digital output circuit 98 produces a voltage signal through the lead 68 strong enough to energize the outside occupancy lamp 45 and to bias both transistors 73 and 74 into conduction. When the transistor 73 conducts, the relay coil 55 is energized to close the air-conditioning relay switch 78 thereby energizing the heating and air-conditioning control to heat or cool, depending upon its set mode for the season of the year, and depending upon the setting of thermostat T.

When the transistor 74 is conducting, the illuminating relay coil 57 is energized to close the relay switch 82 and energize the lamp 30 and the outlet 32.

After the guest or occupant enters the room and closes the door 17, the door switch 35 is re-opened to its solid-line position disclosed in FIG. 4, opening the ground circuit for the lead 36. Since the latch switch 40 in its open or solid-line position is no longer grounded through lead 41 and door switch 35, the timing capacitor 60 commences charging to a predetermined threshold value. At the end of the timing cycle, predetermined by the RC constants of the resistor 59 and capacitor 60, a voltage signal is transmitted through the threshold input lead 67 to the threshold comparator 91. This condition resets the flip-flop 95 and returns the digital output circuit 98 to its low state. Thus, after the door 17 is closed for the predetermined period of the timing cycle, and as long as the latch switch 40 remains open, the low state of the digital output 98 turns off the occupancy lamp 45 and the transistors 73 and 74 to de-energize the relay coils 55 and 57, thereby opening the respective relay switches 78 and 82 to de-energize the heating and air-conditioning control 80, turn off the lamp 30 and de-energize the electrical outlet 32, and any other electrical connections or appliances in the circuit 83.

However, if during the timing cycle, while the door 17 is closed, the override latch switch 40 is closed, to its dashed-line position of FIG. 4, then the charging, timing capacitor 60 will be immediately discharged to ground through the latch switch 40 to cancel out the timing function of the circuit 63. When the latch switch 40 is closed, the digital output circuit 98 remains in its high mode, thereby keeping the lamp 45 energized and maintaining conduction through the transistors 73 and 74 to hold the relay switches 78 and 82 closed, thereby maintaining the heating and air-conditioning control 80 as well as the lamp 30 and electrical outlets 32 in their normal operating and energized conditions. In this manner, the occupant of the room may maintain the normal or high level energy levels within the room 10 as long as he remains in the room and has latched the dead-bolt 19 by manipulating the bolt handle 20. Thus, the closed latch switch 40 overrides the open door switch 35, when the door 17 is closed.

Even after the timing cycle has expired to switch the energy system to its low or inoperative level, the latch switch 40 may still be closed to its dashed-line position to energize the time-delay control circuit 63 and restore the digital output to its high state to re-energize the relay coils 55 and 82 and restore the heating and air-conditioning control 80, lamp 30 and electrical outlets 32 to their normal operating levels.

When the occupant leaves the room 10, he first unlatches the latch 19 to open the latch switch 40 to its solid-line position in FIG. 4. The opening of the latch switch immediately starts the timing function, maintaining the normal operative level of the energy system 25 until the end of the timing cycle. However, the subsequent opening of the door 17 by the departing occupant, closes the door switch 35 to cancel the timing function, causing the energy system 25 to remain at its normal operative level, as long as the door 17 is open. When the departing occupant finally closes the door 17, the door switch 35 is again opened, and the timing function restarted. Thus, as long as the departing occupant, or any one else, does not re-enter the room, the timing cycle will be completed to permit the energy system 25 to revert to its inoperative, lower, or background level. All electrical circuits will then be de-energized and the airconditioning circuits placed under the control of the by-pass thermostatic switches 48 and 49.

The occupancy lamp 45 is mounted on the outside of the door jamb 16 to enable observers on the outside of the door 17 to be apprised if the room 10 is occupied. Such an occupancy lamp 45 for each room is of great benefit to the management of a motel, for example. If the lamp 45 is turned off, it indicates that probably no one is occupying the room 10, and the room is available to authorized personnel, such as inspection and cleaning personnel.

The electrical outlets 32 may be adapted to receive the plugs of floor lamps or television sets or other types of electrical appliances so that they too may be controlled by the electrical system 25.

It will therefore be observed that an electrical system has been provided which will save considerable energy in unoccupied rooms by turning off all electrical appliances and circuits, and the heating and cooling systems when the room is unoccupied. The system 25 further provides a thermostatic overriding or by-passing switches which will permit the heating and cooling systems to continue to operate at lower energy levels in order to maintain milder degrees of heating and cooling within the room.

Furthermore, the entire system 25 is automatic with the exception of the latching of the bolt 19, and even here there is an automatic time-delay provided to give the occupant enough time to throw the latch bolt after he has entered the room and closed the door.

Furthermore, the system is designed so that immediately upon opening the door all of the electrical circuits are thrown into their operative levels and particularly provides for turning on a light within the room as the occupant enters. Furthermore, as soon as the occupant of the room leaves and closes the door 17 the energy system within the room reverts to its background energy level after the predetermined time-delay.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. A system for controlling the energy level within an enclosed space having an entry opening, a door movable to open and close said entry opening, a source of energy and an energy output device, comprising:
  a. an electrical control circuit means connecting said energy source and said energy output device, including
  b. control switch means selectively actuable between relatively closed and open conditions to turn on or turn off said energy output device,
  c. time-delay means in said control circuit,
  d. door sensor means at said entry opening and electrically connected to said control
  e. circuit for closing said control switch means upon detection of the opening of the door
  f. and for actuating said time-delay means to open said control switch means a predetermined elapsed time after said detection of the closing of said door, and
  g. override switch means accessible from within said enclosed space and electrically connected to said control circuit, said override switch means having a first position and a second position,
  h. said override switch means in its first position being connected in said control circuit means to actuate said control switch means to turn on said output device, and
  i. said override switch means in its second position being connected in said control circuit means to actuate said time delay means to turn off said output device after an interval of predetermined time during which said sensor detects said door closed.

2. The invention according to claim 1 in which said override switch means is manually operable between said first and second positions.

3. The invention according to claim 2 in which said override switch means comprises a latch switch mounted in said entry opening and a manually operable latch mounted in said door for actuating said latch switch between its first and second positions when said door is closed.

4. The invention according to claim 1 in which said energy output device is an air-conditioning system, said control switch means being adapted when closed, to turn on said air-conditioning system to maintain a predetermined room temperature limit within said enclosed space, and, when opened, to turn off said air-conditioning system, said control switch means further comprising thermostatic switch means by-passing said first-mentioned switch means whereby said thermostatic switch means turns on said air-conditioning system irrespective of whether said first-mentioned switch means is open or closed to prevent the temperature of said enclosed space from varying beyond a predetermined limit.

5. An entry-controlled electrical energy supply system for an enclosure having an electrical energy consuming device, an access opening, a door for said opening, and a lock accessible from inside the enclosure to lock said door in closed position, comprising
  a. an electrical energy input supply circuit,
  b. a load supply circuit connected to said input supply circuit for supplying electrical energy to an energy consuming device in said enclosure,
  c. switch means for said load supply circuit actuatable between relative closed and open states and for switching the load supply circuit respectively between first and second energy supply capabilities, the first of which capabilities is greater than the second,
  d. and a control circuit for said switch means, including
    1. a door sensor adjacent said door for sensing open and closed conditions and for producing different circuit conditions respectively characteristic thereof,
    2. a door lock sensor adjacent said lock for sensing locked and unlocked conditions and for producing different circuit conditions respectively characteristic thereof,
    3. switch control means for actuating said switch means to said closed state in response to either of said circuit conditions characteristic of door-open or door-locked conditions,
    4. and time delay means operating in response to combined circuit conditions characteristic of door closed and door unlocked conditions for actuating said switch means to said open state after an interval of predetermined duration in which said door remains closed and unlocked.

6. In an entry-controlled energy supply system as claimed in claim 5,
  e. an environmental control means in said enclosure,
  f. another load supply circuit connected to said input supply circuit for supplying electrical energy to said environmental control device,
  g. another switch means switchable between relatively closed and open states for switching said other load supply circuit respectively between first and second energy supply capabilities, the first of which is greater than the second, said other switch means being connected to said control circuit and being actuatable thereby to said closed state in response to either of said circuit conditions characteristic of door-open or door-locked conditions,
  h. and override switch means including environmental sensing means for bypassing said second switch means in response to an environmental condition demanding the operation of said environmental control device in order to maintain a desired environmental condition.

7. An entry-controlled energy supply device as claimed in claim 6,
   e. (1) said environmental control means being a temperature control device,
   h. (1) said override switch means being thermal-responsive.

8. In a room having a door to open and close an opening thereto and a lock accessible from inside said room and operable to lock and unlock said door in closed condition,
   a. load circuit means for an electrically energized device in said room,
   b. switch means operable to open and close the load circuit means, and
   c. control system means for operating said switch, comprising
      c-1. a first circuit control means operated in response to open and closed conditions of said door,
      c-2. a second circuit control means operated in response to door locking and door unlocking condition of said lock, and
      c-3. circuit means operated by said first and second circuit control means for closing said switch means in response to either a door open condition or a door locked condition,
      c-3'. said circuit means including time delay means operated jointly by said first and second circuit control means to open said switch means after a predetermined interval during which both said door is in closed condition and said lock is in door unlocking condition.

* * * * *